(12) United States Patent
Dong et al.

(10) Patent No.: US 11,453,166 B2
(45) Date of Patent: Sep. 27, 2022

(54) UV CURING APPARATUS FOR 3D PRINTING PRODUCT

(71) Applicant: HUAIYIN INSTITUTE OF TECHNOLOGY, Huaian (CN)

(72) Inventors: Yuwei Dong, Huaian (CN); Aihui Liu, Huaian (CN); Zhengbang Dong, Huaian (CN); Yingyu Wang, Huaian (CN); Wenjin Zhao, Huaian (CN); Kewei Wang, Huaian (CN); Jinlin Wan, Huaian (CN); Yingying Guan, Huaian (CN); Lechao Wang, Huaian (CN)

(73) Assignee: HUAIYIN INSTITUTE OF TECHNOLOGY, Huaian (CN)

( * ) Notice: Subject to any disclaimer, the term of this patent is extended or adjusted under 35 U.S.C. 154(b) by 402 days.

(21) Appl. No.: 16/615,107

(22) PCT Filed: Jan. 30, 2018

(86) PCT No.: PCT/CN2018/074527
§ 371 (c)(1),
(2) Date: Nov. 19, 2019

(87) PCT Pub. No.: WO2018/218978
PCT Pub. Date: Dec. 6, 2018

(65) Prior Publication Data
US 2020/0171748 A1    Jun. 4, 2020

(30) Foreign Application Priority Data

May 31, 2017 (CN) .......................... 201710399857.9

(51) Int. Cl.
*B29C 64/291* (2017.01)
*B29C 71/04* (2006.01)
(Continued)

(52) U.S. Cl.
CPC .......... *B29C 64/291* (2017.08); *B29C 64/241* (2017.08); *B29C 64/30* (2017.08);
(Continued)

(58) Field of Classification Search
CPC ..... B29C 64/241; B29C 64/291; B29C 64/30; B29C 71/04; B29C 2035/0827; B33Y 30/00; B33Y 40/20
See application file for complete search history.

(56) References Cited

FOREIGN PATENT DOCUMENTS

| CN | 201760389 U | 3/2011 |
| CN | 206048827 U | * 3/2017 |

(Continued)

OTHER PUBLICATIONS

International Search Report issued in corresponding International Application No. PCT/CN2018/074527, dated Apr. 8, 2018, State Intellectual Property Office of the P.R. China, Beijing, China.
(Continued)

*Primary Examiner* — Mark R Gaworecki
(74) *Attorney, Agent, or Firm* — Hauptman Ham, LLP

(57) ABSTRACT

The present invention discloses a UV curing apparatus for a 3D printing product, including a base. A tray is disposed above the base. The tray is horizontally and rotatably connected around a vertical rotating shaft on the base. A hood concentric with the tray is disposed on the base. The tray is located in the hood, and UV light tubes are arranged on an inner wall of the hood. The tray provides a driving force by means of a driving motor. The driving motor is fixed in the base. As can be seen from the foregoing structure, according to the UV curing apparatus for a 3D printing product in the present invention, a UV curing apparatus applicable to a 3D product is provided, and the surface of the 3D product can be automatically and uniformly subjected to UV curing.

9 Claims, 1 Drawing Sheet

(51) Int. Cl.
 *B29C 64/241* (2017.01)
 *B29C 64/30* (2017.01)
 *B33Y 30/00* (2015.01)
 *B33Y 40/20* (2020.01)
 B29C 35/08 (2006.01)

(52) U.S. Cl.
 CPC .............. *B29C 71/04* (2013.01); *B33Y 30/00* (2014.12); *B33Y 40/20* (2020.01); *B29C 2035/0827* (2013.01)

(56) References Cited

FOREIGN PATENT DOCUMENTS

| | | |
|---|---|---|
| CN | 206048827 U | 3/2017 |
| CN | 107031051 A | 8/2017 |

OTHER PUBLICATIONS

Written Opinion of the International Searching Authority issued in corresponding International Application No. PCT/CN2018/074527, dated Apr. 8, 2018.

\* cited by examiner

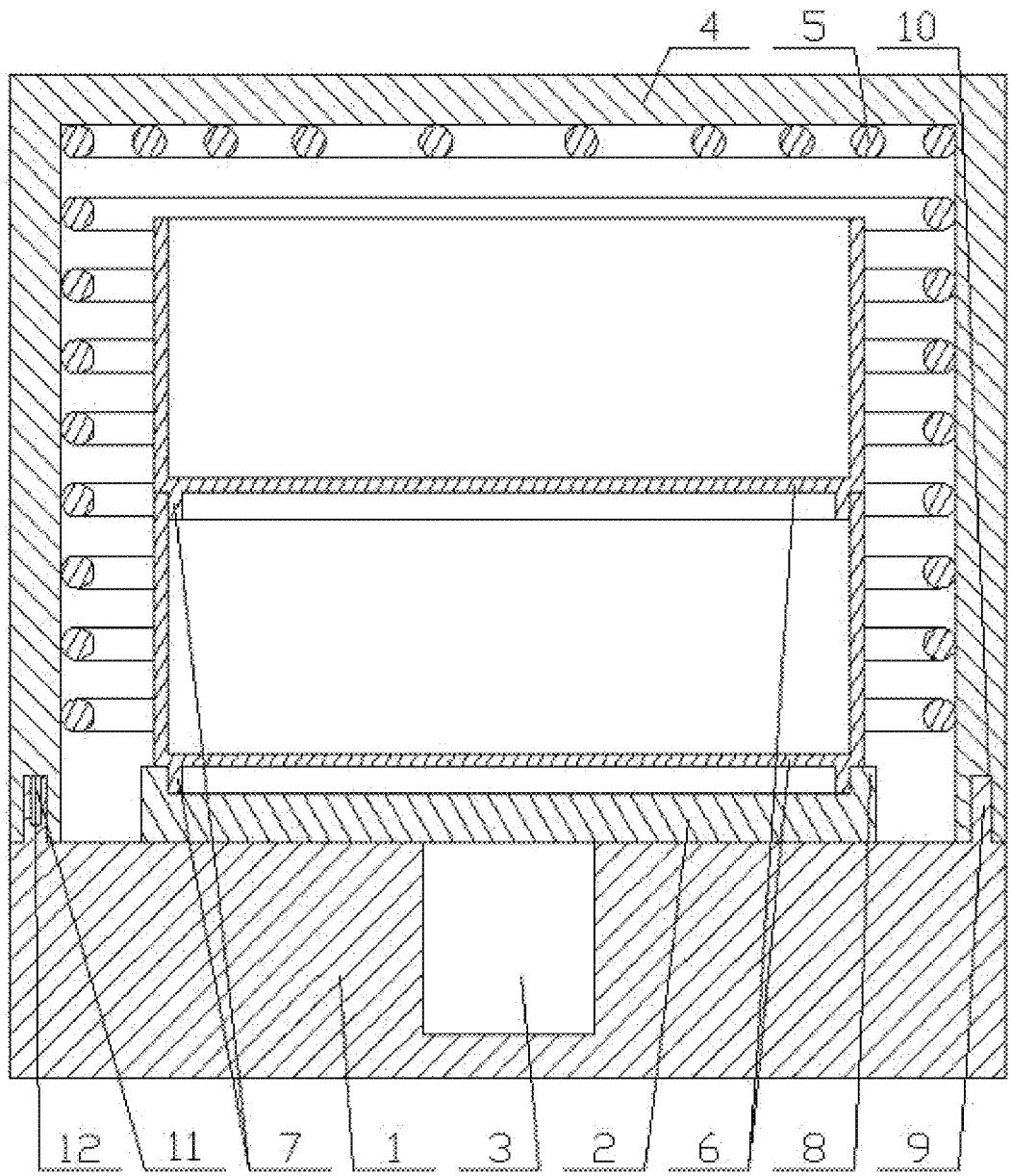

UV CURING APPARATUS FOR 3D PRINTING PRODUCT

RELATED APPLICATION

The present application is a National Phase of International Application Number PCT/CN2018/074527, filed Jan. 30, 2018, which claims priority to Chinese Patent Application No. 201710399857.9, filed May 31, 2017.

TECHNICAL FIELD

The present invention relates to the technical field of UV curing of 3D printing products, and in particular, to a UV curing apparatus for a 3D printing product.

BACKGROUND

3D Printing (3DP) is a type of rapid prototyping technology, and is a technology which constructs an object in a layer-by-layer printing way from a bonding material such as powdered metal or plastic based on a digital model file.

The 3DP is generally implemented by using a digital technology material printer. The 3DP is commonly used for model manufacturing in the field such as mold manufacturing and industrial design, and then is gradually used for direct manufacturing of some products. Parts printed by using the technology exist. The technology is applied to jewelries, footwear, industrial designs, Architecture Engineering and Construction (AEC), automobiles, aeronautics and astronautics, dental and medical industries, educations, geographic information systems, civil engineering, firearms, and other fields.

The 3DP product further needs to undergo a UV curing process. Since the 3DP product has a certain thickness, a long UV curing time period is required. However, there is no UV curing apparatus specifically for the 3DP product on the current market, and the UV curing device on the current market does not provide uniform UV irradiation for the 3D product, and generally irradiates the 3D product from one direction, resulting in incomplete and uneven UV curing of the 3D product, and thus, the use of the 3D product is affected.

SUMMARY

An objective of the present invention is to provide a UV curing apparatus for a 3DP product to overcome deficiencies of the prior art. Provided is a UV curing apparatus applicable to the 3D product, so that the surface of the 3D product can be automatically and uniformly subjected to UV curing. By means of a hollow placement groove, the 3D product can be preferentially placed above the inner top of a hood during curing, so that an irradiation effect of a UV light tube at the inner top of the hood on the 3D product is ensured. The sidewall and groove bottom of the hollow placement groove and a convex ring B are of a hollow structure, so that light emitted from the UV light tube can pass through the hollow placement groove and irradiate the surface of the 3D product, thereby ensuring the irradiation effect of the UV light of the 3D product. The 3D products are arranged from top to bottom, so that the irradiation effect of the UV light tube on the inner top of the hood can be ensured as much as possible. The UV light tubes on the inner sidewall of the hood are uniformly arranged, so that the uniformity of the UV light irradiating on the surface of the 3D product is ensured. The distance between two adjacent UV light tubes on the inner top of the hood gradually increases in an outside-in direction. Since an angle that the UV light tube in the middle of the inner top of the hood can irradiate the 3D product is maximum, and an angle that the UV light tube at a corresponding position can irradiate the 3D product gradually decreases in the inside-out direction, so that the uniformity of the UV light irradiating on the surface of the 3D product is ensured by means of different distances between two adjacent UV light tubes. The UV light tube on the lowermost inner sidewall of the hood is higher than a tray, so as to ensure that all UV light tubes can irradiate the surface of the 3D product. The hood can be fixed to the base by means of a limiting bump and a limiting groove. By means of a conductive pin in the limiting groove and a slot port of the limiting bump, the UV light tubes on the inner wall of the hood can be electrically connected to a control apparatus of the base and a power supply, and the structure is compact. The length of the conductive pin is less than the groove depth of the limiting groove, so that the conductive pin is prevented from bending and even breaking, and the service life of the conductive pin is prolonged. The hollow placement groove can be sequentially stacked on the tray by means of a diameter relationship among a convex ring A, the convex ring B and the inner wall of the hollow placement groove. Heat generated during the irradiation of the UV light tube in the hood is timely discharged out of the hood by means of a fan, so as to ensure that the temperature within the hood is maintained in a reasonable range.

The technical solution used by the present invention is:

a UV curing apparatus for a 3D printed product, including a base, where the tray is disposed above the base; the tray is horizontally and rotatably connected around a vertical rotating shaft on the base; the hood concentric with the tray is provided on the base; the tray is located in the hood; UV light tubes are arranged on an inner wall of the hood; a fan is provided on the hood; the interior of the hood is communicated with the exterior of the hood by means of the fan; the tray provides a driving force by means of a driving motor; and the driving motor is fixed in the base.

A further improvement of the present invention is that: the number of the UV light tubes is plural, and the UV light tubes are respectively fixed to the inner wall of the sidewall of the hood and the inner wall of the top of the hood.

A further improvement of the present invention is that: the UV light tubes are annular light tubes, and the centers of the UV light tubes are all located on a straight line where the axis of the tray is located.

A further improvement of the present invention is that: the UV light tubes located on the inner wall of the sidewall of the hood are respectively fixed on the inner wall of the hood along the inner wall of the sidewall of the hood from bottom to top, and the UV light tubes located on the inner wall of the top of the hood are distributed in a concentric ring manner.

A further improvement of the present invention is that: the distance between two adjacent UV light tubes located on the inner wall of the sidewall of the hood is equal; the distance between two adjacent UV light tubes located on the inner wall of the top of the hood increases gradually in an outside-in direction; and the distance between two adjacent UV light tubes located on the inner wall of the sidewall of the hood is equal to the distance between two adjacent UV light tubes located on the outermost side of the inner wall of the top of the hood.

A further improvement of the present invention is that: the height of the UV light tubes located on the lowermost inner wall of the sidewall of the hood is higher than the height of the highest point of the top of the tray.

A further improvement of the present invention is that: the bottom end of the sidewall of the hood is provided with a limiting groove; a limiting bump is fixed at the top surface of the base corresponding to the limiting groove; and the limiting bump matches the limiting groove.

A further improvement of the present invention is that: at least one limiting groove and at least one limiting bump are correspondingly provided; when there is only one limiting groove and one limiting bump, the groove bottom of the limiting groove is downwardly provided with a conductive pin, and a slot port is provided at the top of the limiting bump corresponding to the conductive pin; when there is more than one limiting groove and limiting bump, the groove bottom of one of the limiting grooves is downwardly provided with the conductive pin, and the slot port is provided at the top of the limiting bump corresponding to the conductive pin, the limiting bump corresponding to the limiting groove.

A further improvement of the present invention is that: the conductive pin is electrically connected to the UV light tubes and the fan; the slot port is electrically connected to the power supply disposed in the base by means of the control apparatus disposed in the base; and the driving motor is electrically connected to the power supply by means of the control apparatus.

A further improvement of the present invention is that: the length of the conductive pin is less than or equal to the groove depth of the limiting groove.

A further improvement of the present invention is that: a convex ring A is upwardly provided on the edge of the top of the tray, and the convex ring A and the tray are provided concentric with each other.

A further improvement of the present invention is that: the 3DP products are stacked on the tray by means of the hollow placement groove having an open top; the bottom of the hollow placement groove is downwardly and concentrically provided with the convex ring B; the external diameter of the convex ring B matches the internal diameter of the convex ring A; and the internal diameter of the sidewall of the hollow placement groove is equal to the internal diameter of the convex ring A.

A further improvement of the present invention is that: the groove wall and groove bottom of the hollow placement groove and the convex ring B are of a hollow structure.

The present invention has the following beneficial effects.

First, according to the UV curing apparatus for a 3DP product in the present invention, the UV curing apparatus applicable to the 3D product is provided, and the surface of the 3D product can be automatically and uniformly subjected to UV curing.

Second, according to the UV curing apparatus for a 3DP product in the present invention, by means of the hollow placement groove, the 3D product can be preferentially placed above the inner top of a hood during UV curing, so that the irradiation effect of the UV light tube on the inner top of the hood for the 3D product is ensured.

Third, according to the UV curing apparatus for a 3DP product in the present invention, the sidewall and groove bottom of the hollow placement groove and the convex ring B are of a hollow structure, so that the light emitted from the UV light tube can pass through the hollow placement groove and irradiate to the surface of the 3D product, and the irradiation effect of the UV light of the 3D product is ensured.

Fourth, according to the UV curing apparatus for a 3DP product in the present invention, the 3D products are arranged from top to bottom, so that the irradiation effect of the UV light tube on the inner top of the hood can be ensured as much as possible.

Fifth, according to the UV curing apparatus for a 3DP product in the present invention, the UV light tubes on the inner sidewall of the hood are uniformly arranged, so that the uniformity of the UV light irradiating on the surface of the 3D product is ensured.

Sixth, according to the UV curing apparatus for a 3DP product in the present invention, the distance between two adjacent UV light tubes on the inner top of the hood gradually increases in an outside-in direction. Since the angle that the UV light tube in the middle of the inner top of the hood can irradiate the 3D product is maximum, and an angle that the UV light tube at the corresponding position can irradiate the 3D product gradually decreases in the inside-out direction, so that the uniformity of the UV light irradiating on the surface of the 3D product is ensured by means of different distances between two adjacent UV light tubes.

Seventh, according to the UV curing apparatus for a 3DP product in the present invention, the UV light tube on the lowermost inner sidewall of the hood is higher than the tray, so as to ensure that all UV light tubes can irradiate on the surface of the 3D product.

Eighth, according to the UV curing apparatus for a 3DP product in the present invention, the hood can be fixed to the base by means of the limiting bump and the limiting groove.

Ninth, according to the UV curing apparatus for a 3DP product in the present invention, by means of the conductive pin in the limiting groove and the slot port of the limiting bump, the UV light tubes on the inner wall of the hood can be electrically connected to the control apparatus of the base and the power supply, and the structure is compact.

Tenth, according to the UV curing apparatus for 3DP product in the present invention, the length of the conductive pin is less than the groove depth of the limiting groove, so that the conductive pin is prevented from bending and even breaking, and the service life of the conductive pin is prolonged.

Eleventh, according to the UV curing apparatus for a 3DP product in the present invention, the hollow placement groove can be sequentially stacked on the tray by means of the diameter relationship among the convex ring A, the convex ring B and the inner wall of the hollow placement groove.

Twelfth, according to the UV curing apparatus for a 3DP product in the present invention, heat generated during the irradiation of the UV light tube in the hood is timely discharged out of the hood by means of the fan, so as to ensure that the temperature within the hood is maintained in the reasonable range.

BRIEF DESCRIPTION OF THE DRAWINGS

The drawing is a schematic front sectional view of the structure according to the present invention.

DETAILED DESCRIPTION

As shown in the drawing, the present invention includes a base 1. A tray 2 is disposed above the base 1. The tray 2 is horizontally and rotatably connected around a vertical rotating shaft on the base 1. A hood 4 concentric with the tray 2 is provided on the base 1. The tray 2 is located in the hood 4, and UV light tubes 5 are arranged on the inner wall of the hood 4. A fan (not shown) is disposed on the hood 4. The interior of the hood 4 is communicated with the exterior of the hood 4 by means of the fan. The tray 2 provides a driving force by means of a driving motor 3. The driving motor 3 is fixed in the base 1. The number of the UV light tubes 5 is plural, and the UV light tubes 5 are respectively fixed to the inner wall of the sidewall of the hood 4 and the inner wall of the top of the hood 4. The UV light tubes 5 are annular light tubes, and all the centers of the UV light tubes 5 are located on a straight line where the axis of the tray 2 is located. The UV light tubes 5 located on the inner wall of the sidewall of the hood 4 are respectively fixed on the inner wall of the hood 4 along the inner wall of the sidewall of the hood 4 from bottom to top, and the UV light tubes 5 located on the inner wall of the top of the hood 4 are distributed in a concentric ring manner. The distance between two adjacent UV light tubes 5 located on the inner wall of the sidewall of the hood 4 is equal. The distance between two adjacent UV light tubes 5 located on the inner wall of the top of the hood 4 increases gradually in an outside-in direction, and the distance between two adjacent UV light tubes 5 located on the inner wall of the sidewall of the hood 4 is equal to the distance between two adjacent UV light tubes 5 located on the outermost side of the inner wall of the top of the hood 4. The height of the UV light tubes 5 located on the lowermost inner wall of the sidewall of the hood 4 is higher than the height of the highest point of the top of the tray 2. The bottom end of the sidewall of the hood 4 is provided with a limiting groove 10. A limiting bump 9 is fixed at the top surface of the base 1 corresponding to the limiting groove 10. The limiting bump 9 matches the limiting groove 10. At least one limiting groove 10 and at least one limiting bump 9 are correspondingly provided. When there is only one limiting groove 10 and one limiting bump 9, the groove bottom of the limiting groove 10 is downwardly provided with a conductive pin 12, and a slot port 11 is provided at the top of the limiting bump 9 corresponding to the conductive pin 12. When there is more than one limiting groove 10 and limiting bump 9, the groove bottom of one of the limiting grooves 10 is downwardly provided with the conductive pin 12, and the slot port 11 is provided at the top of the limiting bump 9 corresponding to the conductive pin 12, limiting bump 9 corresponding to the limiting groove 10. The conductive pin 12 is electrically connected to the UV light tubes 5 and the fan. The slot port 11 is electrically connected to the power supply disposed in the base 1 by means of the control apparatus disposed in the base 1. The driving motor 3 is electrically connected to the power supply by means of the control apparatus. The length of the conductive pin 12 is less than or equal to the groove depth of the limiting groove 10. A convex ring A8 is upwardly provided on the edge of the top of the tray 2, and the convex ring A8 and the tray 2 are provided concentric with each other. The 3DP products are stacked on the tray 2 by means of a hollow placement groove 6 having an open top. The bottom of the hollow placement groove 6 is downwardly and concentrically provided with a convex ring B7. The external diameter of the convex ring B7 matches the internal diameter of the convex ring A8. The internal diameter of the sidewall of the hollow placement groove 6 is equal to the internal diameter of the convex ring A8. The groove wall and groove bottom of the hollow placement groove 6 and the convex ring B7 are of a hollow structure.

During the use of the present invention, the hood 4 is first separated from the base 1. If it is only necessary to perform UV curing on one 3D product, the hollow placement groove 6 is limited and fixed to the tray 2 by means of the convex ring B7 on the bottom of the hollow placement groove 6, then the hollow placement groove 6 is stacked upwardly by means of the convex ring B7 and the hollow placement groove 6, and then the 3D product requiring UV curing is placed in the uppermost layer of the hollow placement groove 6. If it is necessary to perform UV curing on multiple 3D products simultaneously, the 3D products are sequentially placed in the stacked hollow placement groove 6 from top to bottom, and the top of the uppermost layer of the hollow placement groove 6 and the top of the 3D product placed in the uppermost layer of the hollow placement groove 6 are ensured to be lower than the UV light tube 5 on the top of the hood 4; then the hood 4 is fixed to the base 1 by means of the limiting groove 10 and the limiting bump 9, and the conductive pin 12 is inserted in the slot port 11, so that the UV light tube 5 and the fan are electrically connected to the control apparatus; the control apparatus controls the UV light tubes 5 on the inner top of the hood 4 to illuminate, controls, according to the number of the 3D products on the base 1, the UV light tubes 5 on the inner sidewall of the hood 4 to illuminate, and simultaneously controls the fan to start; furthermore, the control apparatus also controls the driving motor 3 to drive the tray 2 to rotate, and drives, by means of the rotation of the tray 2, the 3D product in the hollow placement groove 6 to simultaneously rotate, so that the surface of the 3D product can be uniformly irradiated by the UV light tubes 5, and not only the UV curing efficiency of the 3D product is improved, but also the UV curing effect of the 3D product is ensured. After the UV curing is completed, it is only required to open the hood 4, then the hollow placement groove 6 is sequentially taken down, and the 3D product is taken out of the hollow placement groove 6.

The invention claimed is:

1. A UV curing apparatus for a 3D printing product, comprising a base (1), wherein a tray (2) is disposed above the base (1); the tray (2) is horizontally and rotatably connected around a vertical rotating shaft on the base (1); a hood (4) concentric with the tray (2) is disposed on the base (1); the tray (2) is located in the hood (4); UV light tubes (5) are arranged on an inner wall of the hood (4); a fan is disposed on the hood (4); the interior of the hood (4) is communicated with the exterior of the hood (4) by means of the fan; the tray (2) provides a driving force by means of a driving motor (3); and the driving motor (3) is fixed in the base (1), wherein a convex ring A (8) is upwardly provided on the edge of the top of the tray (2), and the convex ring A (8) and the tray (2) are provided concentric with each other.

2. The UV curing apparatus for a 3D printing product according to claim 1, wherein the number of the UV light tubes (5) is plural; and the UV light tubes (5) are respectively fixed to the inner wall of a sidewall of the hood (4) and the inner wall of the top of the hood (4).

3. The UV curing apparatus for a 3D printing product according to claim 2, wherein the UV light tubes (5) are annular light tubes, and all the centers of the UV light tubes (5) are located on a straight line where the axis of the tray (2) is located.

4. The UV curing apparatus for a 3D printing product according to claim 3, wherein the UV light tubes (5) located on the inner wall of the sidewall of the hood (4) are respectively fixed on the inner wall of the hood (4) along the inner wall of the sidewall of the hood (4) from bottom to top, and the UV light tubes (5) located on the inner wall of the top of the hood (4) are distributed in a concentric ring manner.

5. The UV curing apparatus for a 3D printing product according to claim 4, wherein the distance between two adjacent UV light tubes (5) located on the inner wall of the sidewall of the hood (4) is equal; the distance between two adjacent UV light tubes (5) located on the inner wall of the top of the hood (4) increases gradually in an outside-in direction; and the distance between two adjacent UV light tubes (5) located on the inner wall of the sidewall of the hood (4) is equal to the distance between two adjacent UV light tubes (5) located on the outermost side of the inner wall of the top of the hood (4).

6. The UV curing apparatus for a 3D printing product according to claim 2, wherein the height of the UV light tubes (5) located on the lowermost inner wall of the sidewall of the hood (4) is higher than the height of the highest point of the top of the tray (2).

7. The UV curing apparatus for a 3D printing product according to claim 1, wherein the bottom end of a sidewall of the hood (4) is provided with a limiting groove (10); a limiting bump (9) is fixed at the top surface of the base (1) corresponding to the limiting groove (10); and the limiting bump (9) matches the limiting groove (10).

8. The UV curing apparatus for a 3D printing product according to claim 7, wherein at least one limiting groove (10) and at least one limiting bump (9) are correspondingly provided; when there is only one limiting groove (10) and one limiting bump (9), the groove bottom of the limiting groove (10) is downwardly provided with a conductive pin (12), and a slot port (11) is provided at the top of the limiting bump (9) corresponding to the conductive pin (12); when there is more than one limiting groove (10) and limiting bump (9), the groove bottom of one of the limiting grooves (10) is downwardly provided with the conductive pin (12), and the slot port (11) is provided at the top of the limiting bump (9) corresponding to the conductive pin (12), the limiting bump (9) corresponding to the limiting groove (10).

9. The UV curing apparatus for a 3D printing product according to claim 1, wherein the 3D printing products are stacked on the tray (2) by means of a hollow placement groove (6) having an open top; the bottom of the hollow placement groove (6) is downwardly and concentrically provided with a convex ring B (7); the external diameter of the convex ring B (7) matches the internal diameter of the convex ring A (8); and the internal diameter of a sidewall of the hollow placement groove (6) is equal to the internal diameter of the convex ring A (8).

* * * * *